United States Patent
Inoue

(10) Patent No.: US 12,246,440 B2
(45) Date of Patent: Mar. 11, 2025

(54) MOBILE ROBOT, MOBILE MANIPULATOR, METHOD FOR CONTROLLING MOBILE ROBOT, AND NON-TRANSITORY COMPUTER READABLE MEDIUM

(71) Applicant: OMRON Corporation, Kyoto (JP)

(72) Inventor: Takahiro Inoue, Kyoto (JP)

(73) Assignee: OMRON Corporation, Kyoto (JP)

( * ) Notice: Subject to any disclaimer, the term of this patent is extended or adjusted under 35 U.S.C. 154(b) by 71 days.

(21) Appl. No.: 18/020,426

(22) PCT Filed: Mar. 5, 2021

(86) PCT No.: PCT/JP2021/008765
§ 371 (c)(1),
(2) Date: Feb. 9, 2023

(87) PCT Pub. No.: WO2022/064737
PCT Pub. Date: Mar. 31, 2022

(65) Prior Publication Data
US 2023/0294311 A1    Sep. 21, 2023

(30) Foreign Application Priority Data
Sep. 28, 2020    (JP) ................................. 2020-162475

(51) Int. Cl.
*B25J 5/00*        (2006.01)
*B25J 9/16*        (2006.01)
(Continued)

(52) U.S. Cl.
CPC ........... *B25J 19/005* (2013.01); *B25J 9/1612* (2013.01); *B25J 19/06* (2013.01); *B25J 5/00* (2013.01)

(58) Field of Classification Search
CPC ......... B25J 19/005; B25J 19/06; B25J 9/1612
(Continued)

(56) References Cited

U.S. PATENT DOCUMENTS

| 9,425,647 B2 * | 8/2016 | Nomoto ................ H02J 7/1446 |
| 2002/0078914 A1 * | 6/2002 | Manabe ............. F02N 11/0862 |
| | | 123/179.3 |

(Continued)

FOREIGN PATENT DOCUMENTS

| CN | 102689599 | 9/2012 |
| CN | 103053091 | 4/2013 |

(Continued)

OTHER PUBLICATIONS

"International Search Report (Form PCT/ISA/210) of PCT/JP2021/008765", mailed on May 25, 2021, with English translation thereof, pp. 1-4.

(Continued)

Primary Examiner — Erick D Glass
(74) Attorney, Agent, or Firm — JCIPRNET

(57) ABSTRACT

A mobile robot (1) for providing a mobile robot that prevents the output current of a battery from exceeding the rated current due to inrush current of an electric load comprises a voltage acquisition unit (11) for acquiring the voltage of a battery (21) for supplying electric power to a manipulator (31), a condition determination unit (12) for determining whether the voltage is in a specific range, and a starting control unit (13) for disabling starting of the manipulator (31) when the voltage is determined to be in the specific range. The specific range is a voltage range that is a portion of the voltage range in which the manipulator (31) can be operated.

9 Claims, 6 Drawing Sheets

(51) Int. Cl.
  *B25J 19/00* (2006.01)
  *B25J 19/06* (2006.01)
(58) Field of Classification Search
  USPC .................................................. 318/568.12
  See application file for complete search history.

(56) References Cited

U.S. PATENT DOCUMENTS

| | | | | |
|---|---|---|---|---|
| 2015/0298630 | A1* | 10/2015 | Iwai | B60R 16/033 |
| | | | | 324/426 |
| 2016/0152156 | A1 | 6/2016 | Pritelli et al. | |
| 2022/0331047 | A1* | 10/2022 | Shelton, IV | G16H 20/40 |
| 2023/0408595 | A1* | 12/2023 | Ikeda | H01M 10/4264 |

FOREIGN PATENT DOCUMENTS

| | | |
|---|---|---|
| CN | 103095117 | 5/2013 |
| CN | 106183480 | 12/2016 |
| CN | 106826836 | 6/2017 |
| DE | 102008050272 | 5/2009 |
| EP | 1635438 | 3/2006 |
| JP | 2000342496 | 12/2000 |
| JP | 2006081369 | 3/2006 |
| JP | 2006285547 | 10/2006 |
| JP | 2007161016 | 6/2007 |
| JP | 2007221847 | 8/2007 |
| JP | 2016195496 | 11/2016 |
| KR | 20180087039 | 8/2018 |
| WO | 2013082982 | 6/2013 |

OTHER PUBLICATIONS

"Written Opinion of the International Searching Authority (Form PCT/ISA/237) of PCT/JP2021/008765", mailed on May 25, 2021, with English translation thereof, pp. 1-8.
"Search Report of Europe Counterpart Application", issued on Sep. 25, 2024, pp. 1-11.
Shuguang Pei, "Transformation and upgrading of intelligent mobile robot control technology", Electronic Technology and Software Engineering, Jan. 15, 2020, pp. 92-93, Issue 2.
"Office Action of China Counterpart Application", issued on Dec. 23, 2024, with English translation thereof, p. 1-p. 20.

* cited by examiner

MOBILE ROBOT, MOBILE MANIPULATOR, METHOD FOR CONTROLLING MOBILE ROBOT, AND NON-TRANSITORY COMPUTER READABLE MEDIUM

CROSS-REFERENCE TO RELATED APPLICATION

This application is a 371 application of the International PCT application serial no. PCT/JP2021/008765, filed on Mar. 5, 2021, which claims the priority benefits of Japan Patent Application No. 2020-162475, filed on Sep. 28, 2020. The entirety of each of the above-mentioned patent applications is hereby incorporated by reference herein and made a part of this specification.

TECHNICAL FIELD

The invention relates to a mobile robot.

RELATED ART

There is a mobile manipulator that is a mobile robot in which a manipulator is mounted. The mobile manipulator is used to transfer a workpiece in a factory.

Here, Patent Document 1 discloses a technique of determining whether the power of a main battery is usable at the time of starting an electric vehicle including an engine and using the power of the main battery.

PRIOR ART DOCUMENTS

Patent Documents

[Patent Document 1] Japanese Laid-open No. 2006-285547

SUMMARY OF INVENTION

Technical Problem

However, in the conventional art described above, in the case where the charge residual amount of the battery is estimated from the voltage of the battery, and the charge residual amount of the battery is equal to or lower than a threshold, the electric vehicle (hybrid vehicle) stops using the main battery, and starts the engine to travel.

However, since the manipulator mounted in the mobile robot has a multi-axis high-output motor, the battery may be damaged by an inrush current at the time of starting. Therefore, it may be insufficient to consider only the charge residual amount of the battery, and it is necessary to avoid exceeding the maximum current value of the battery that operates the mobile manipulator.

An objective of an aspect of the invention is to provide a mobile robot that prevents an output current of a battery from exceeding a rated current due to an inrush current of an electric load.

Means for Solving the Issue

In order to solve the above issue, a mobile robot according to an aspect of the invention is a mobile robot capable of mounting an electric load. The mobile robot includes: a voltage acquisition unit, acquiring a voltage of a battery supplying power to the electric load; a condition determination unit, determining whether the voltage falls within a specific range; and a starting control unit, in a case where the condition determination unit determines that the voltage falls within the specific range, (i) disabling starting of the electric load, or (ii) supplying the voltage of the battery that has been transformed to the electric load to start the electric load. The specific range is a portion of a voltage range in which the electric load is operable.

A method for controlling a mobile robot according to an aspect of the invention includes: a voltage acquisition step of acquiring a voltage of a battery supplying power to an electric load mounted in the mobile robot; a condition determination step of determining whether the voltage falls within a specific range; and a starting control step of, in a case where the voltage is determined as falling within the specific range in the condition determination step, (i) disabling starting of the electric load, or (ii) supplying the voltage of the battery that has been transformed to the electric load to start the electric load. The specific range is a portion of a voltage range in which the electric load is operable.

Inventive Effects

According to an aspect of the invention, a mobile robot that prevents an output current of a battery from exceeding a rated current due to an inrush current of an electric load is provided.

DESCRIPTION OF EMBODIMENTS

Embodiment

Figure 1:
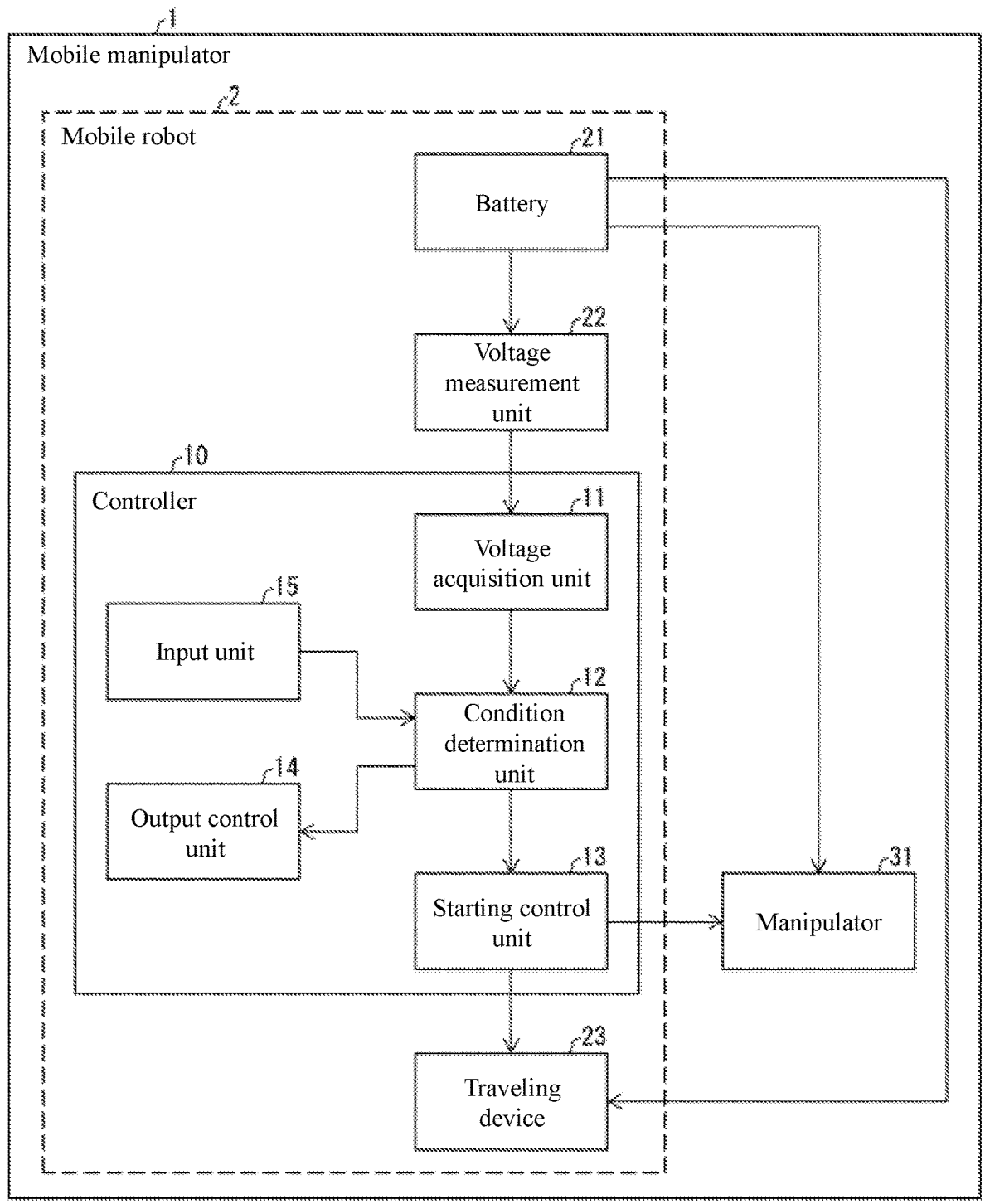
FIG. 1 is a diagram illustrating a configuration of main components of a mobile manipulator according to an embodiment.

In the following, an embodiment (referred to as "the embodiment" in the following) according to an aspect of the invention is described with reference to the drawings. It is noted that the same components in the drawings are labeled with the same reference symbols, and the descriptions thereof will not be repeated.

1. Application Example (Relationship Between Inrush Current Due to Electric Load and Voltage)

In general, a manipulator includes a multi-axis, high-output motor and a stable power device with a large capacity.

Therefore, such manipulator may easily become very large as an electric load. In particular, since a high-output motor consumes a large amount of power to start when starting, the inrush current increases under the condition that the input voltage is low. Such property is not limited to high-output motors, but applies to any electric load that consumes a large amount of power when starting.

Comparatively, in the case of an electric load including a power device including a capacitor with a large electrostatic capacity on the input primary side and designed so that the output power is stable, such as a stable power device with a large capacity, the capacitor is charged immediately after the power is turned on. Therefore, the inrush current is present at the maximum value under the condition that the input voltage is high.

That is, the condition under which the inrush current increases differs as the type of electric load differs. That is, if a conventional electric apparatus in which multiple electric loads are combined is considered, it can be said that the inrush current of such electric apparatus varies with the properties of the electric loads and the state of the power voltage.

(Operation and Starting of an Electric Load by Using a Battery)

In addition, in the case where an electric load is driven by a battery, in order to operate the electric load, it is required that the power that the battery is able to supply exceed the rated power of the electric apparatus. In order to start the electric load, it is required that the inrush current of the electric apparatus is equal to or lower than the rated current value of the battery. In the mobile robot according to the embodiment, in the case where the voltage of the battery falls within a specific range, such as the case where the inrush current of the electric load is higher than a predetermined value, the starting of the electric load is disabled.

2. Configuration Example

FIG. 1 is a block diagram illustrating main components of a mobile manipulator 1.

(Configuration of the Mobile Manipulator)

The mobile manipulator 1 includes a mobile robot 2 and a manipulator (electric load) 31. The mobile robot 2 includes a controller 10, a battery 21, a voltage measurement unit 22, and a traveling device 23. The mobile robot 2 is an unmanned conveyor able to carry various electric apparatuses (electric loads). The controller 10 has a function of coordinating and controlling respective units of the mobile manipulator 1.

The battery 21 is a secondary battery supplying power to the respective units (the controller 10, the traveling device 23, and the manipulator 31) of the mobile manipulator 1. The mobile manipulator 1 is charged by charging the battery 21 in a predetermined charging station or by replacing the battery 21 with a charged battery.

The voltage measurement unit 22 measures the voltage of the battery 21. The voltage measurement unit 22 outputs the measured voltage to the controller 10.

The traveling device 23 is a device that allows the mobile robot 2 to travel. The traveling device 23 operates by using the power supplied from the battery 21.

The manipulator 31 is an electric load mounted in the mobile robot 2. The electric load is not limited to the manipulator 31, and may be any electric load. The manipulator 31 includes a multi-axis, high-output motor and a stable power device with a large capacity. Therefore, the inrush current at the time of starting tends to increase. For example, the electric load may be a conveyor, a motor, an electric cylinder, a vacuum pump, a DC-AC inverter, a DC-DC converter, a battery charger, a heat-retaining storage, a cold-insulating storage, or an arithmetic processing device that requires a large current, etc.

(Configuration of the Controller)

The controller 10 includes a voltage acquisition unit 11, a condition determination unit 12, a starting control unit 13, an output control unit 14, and an input unit 15. The controller 10 may also control the operation of the traveling device 23 or the operation of the manipulator 31.

The voltage acquisition unit 11 acquires the voltage measured by the voltage measurement unit 22. The acquired voltage is transmitted to the condition determination unit 12.

The condition determination unit 12 determines whether the acquired voltage falls within a specific range set in advance. The condition determination unit 12 transmits the determination result to the starting control unit 13 and the output control unit 14. The specific range can be set arbitrarily.

The starting control unit 13 outputs a signal for starting the manipulator 31 in accordance with the determination result of the condition determination unit 12. In the case where the condition determination unit 12 determines that the acquired voltage falls within the specific range, the starting control unit 13 disables the starting of the manipulator 31, and in the case where the condition determination unit 12 determines that the acquired voltage does not fall within the specific range, the starting control unit 13 allows the starting of the manipulator 31 and starts the manipulator 31. In addition, the starting control unit 13 allows the traveling device 23 to start and travel regardless of the result of the condition determination unit 12 (i.e., does not disable starting and operating).

In the case where the condition determination unit 12 determines that the acquired voltage falls within the specific range, the output control unit 14 uses an external device to notify the operator or a management server that the voltage of the battery 21 is not suitable for starting the manipulator 31. When notifying, the output control unit 14 may also notify the operator by using an external device such as a display, a buzzer, or a signal tower not shown herein. The operator or the manager viewing the management server may replace or charge the battery 21 so that the measured voltage falls out of the specific range.

The input unit 15 possesses a function of setting the specific range used in the determination made by the condition determination unit 12. The input unit 15 may perform communication with an external personal computer via a network, receive an input of changing the specific range, and set the specific range. The communication means may be of any communication standard, such as universal serial bus (USB, registered trademark), Ethernet (registered trademark) or Wi-Fi (registered trademark).

3. Operation Example (Operation Example in the Case of Replacing the Battery 21)

Figure 2:
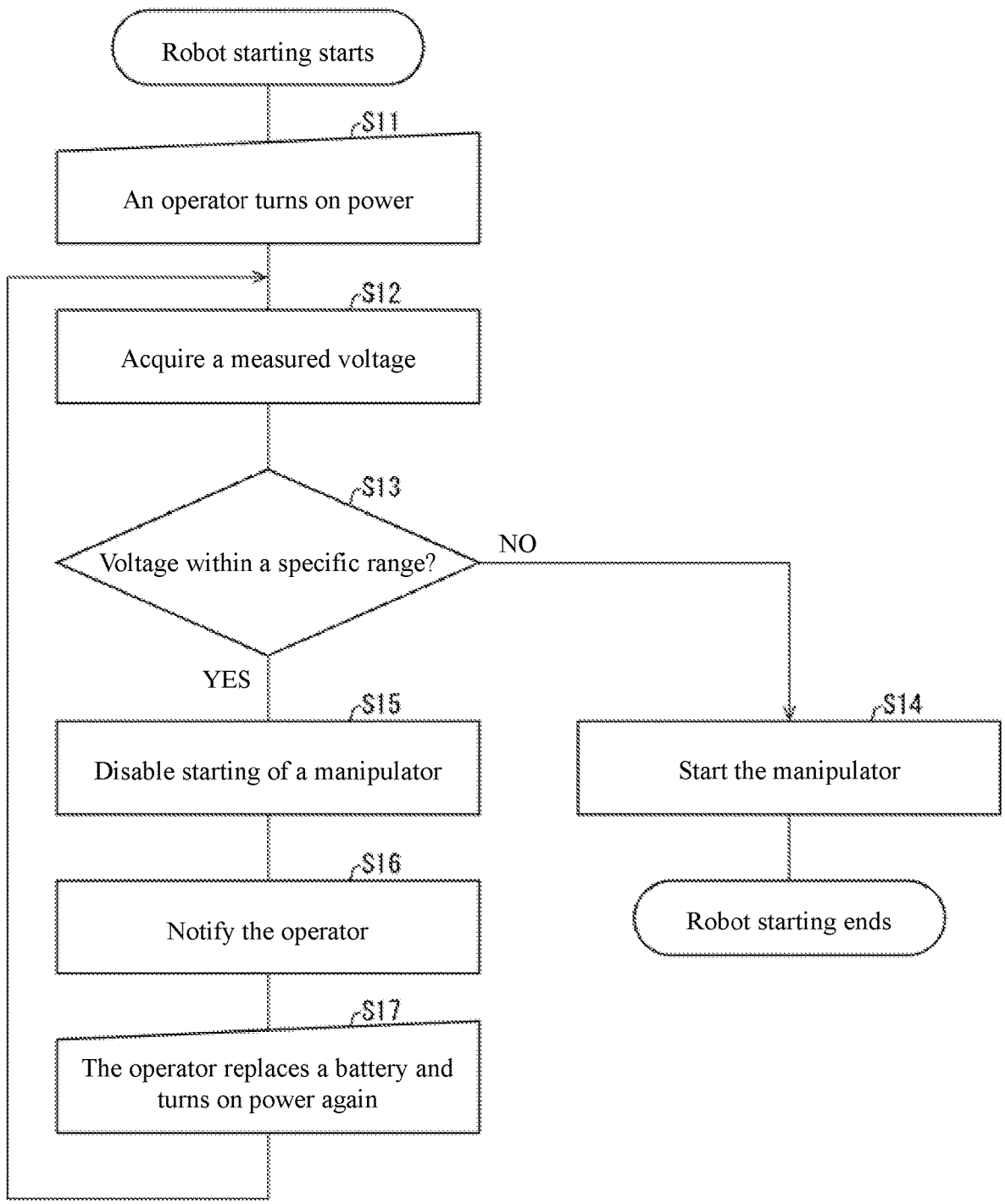
FIG. 2 is a flowchart illustrating a process of the mobile manipulator in a case of replacing a battery when a voltage of the battery falls within a specific range according to an embodiment.

FIG. 2 is a flowchart illustrating a process of the mobile manipulator 1 in the case of replacing the battery 21 when the voltage of the battery 21 falls within the specific range. It is assumed that the charge residual amount of the battery 21 is sufficient for operating the mobile manipulator 1.

In S11, the operator turns on the power of the mobile manipulator 1. In order to reduce the inrush current, the mobile manipulator 1 does not turn on the power of the entire mobile manipulator 1 at the same time, but turns on the power in order, with priority, from the necessary components. That is, the mobile manipulator 1 initially turns on the power of the controller 10, and then turns on the power of the voltage measurement unit 22 and the traveling device 23. However, the power of the manipulator 31 is not turned on in S11, but turned on in a subsequent step.

In S12, the voltage measurement unit 22 measures the voltage of the battery 21. The voltage acquisition unit 11 acquires the voltage of the battery 21 measured by the voltage measurement unit 22. The voltage acquisition unit 11 transmits the acquired voltage of the battery 21 to the condition determination unit 12.

In S13, the condition determination unit 12 determines whether the acquired voltage of the battery 21 falls within the specific range set in advance. The specific range is a setting value set by the input unit 15, and is a voltage range of the battery 21 in which the starting of the manipulator 31 is disabled. The specific range is a voltage range that is a portion of a voltage range in which the manipulator 31 can be operated normally. The condition determination unit 12 transmits the determination result to the starting control unit 13 and the output control unit 14.

In S13, in the case where the acquired voltage of the battery 21 does not fall within the specific range (NO in S13), the flow proceeds to S14. In S14, the starting control unit 13 turns on the power of the manipulator 1 (starts the manipulator 1). This is because the acquired voltage of the battery 21 does not fall within the specific range, and therefore the output current of the battery 21 including the inrush current of the manipulator 31 is equal to or less than the rated current of the battery 21. Therefore, the condition determination unit 12 determines that the power of the manipulator 31 may also be turned on. In addition to the inrush current of the manipulator 31, the output current of the battery 21 also includes currents to other apparatuses (the controller 10 and the traveling device 23, etc.) in operation. The controller 10 ends the starting process.

In S13, in the case where the acquired voltage of the battery 21 falls within the specific range (YES in S13), the flow proceeds to S15. In S15, the starting control unit 13 disables power-on (start) of the manipulator 1. This is because the acquired voltage of the battery 21 falls within the specific range, and therefore the output current of the battery 21 including the inrush current of the manipulator 31 exceeds the rated current of the battery 21. Therefore, the condition determination unit 12 determines that, once the power of the manipulator 31 is turned on, the battery 21 is damaged.

However, the starting control unit 13 only disables the power-on of the manipulator 31, but does not disable the starting of the traveling device 23. Therefore, with the condition determination unit 12, even in the case where the voltage of the battery 21 falls within the specific range, the starting control unit 13 still allows traveling by using the traveling device 23. The mobile manipulator 1 can be moved to any position, such as a charging/discharging station that performs charging/discharging, or an idling position that does not get in the way at the work site.

In addition, even if the voltage of the battery 21 falls within the specific range, the starting control unit 13 does not disable the manipulator 31 that has been started from continuing to operate. Even if the output voltage of the battery 21 falls within the specific range, it is possible for the manipulator 31 to be operated normally by using the battery 21. Therefore, even if the voltage of the battery 21 falls within the specific range during operation of the manipulator 31, the starting control unit 13 does not turn off the power of the manipulator 31, and the operation of the manipulator 31 continues. The magnitude of the inrush current when an electric load (e.g., the manipulator 31) is started changes in accordance with the output voltage of the battery 21. Therefore, the output voltage range (specific range) in which the inrush current is excessively large differs in accordance with the electric load mounted in the mobile robot.

For example, if the electric load is an electric load designed to consume a certain amount of power at the time of starting of the electric load, the inrush current is greater than the predetermined value in a voltage range in which the output voltage of the battery 21 is low. In such case, in the voltage range (from A to B) in which the electric load is operable, a range from A to C may be set as the specific range (A<C<B).

Meanwhile, if the electric load is an electric load that includes a power device including a capacitor with a large electrostatic capacity on the input primary side and designed to stabilize the output voltage, the inrush current is greater than the predetermined value in a voltage range in which the output voltage of the battery 21 is low. In such case, in the voltage range (from A to B) in which the electric load is operable, a range from A to D may be set as the specific range (A<D<B).

For example, in an electric load including power devices of multiple systems, the two tendencies may overlap. Additionally, the start timing of each power device may differ in accordance with the electric load. Therefore, there are also electric loads whose inrush currents are greater than the predetermined value in an intermediate voltage range. In such case, in the voltage range (from A to B) in which the electric load is operable, a range from C to D may be set as the specific range (A<C<D<B). In addition, in the case where the inrush current is greater than the predetermined value in multiple voltage ranges separated from each other, the corresponding multiple voltage ranges may be set as the specific ranges.

It is noted that the battery 21 also supplies power other than to the electric load. For example, a voltage range in which a sum of the current supplied to other apparatuses (the traveling device, etc.) by the battery 21 and the inrush current of the electric load exceeds the rated current of the battery 21 is set as the specific range.

In S16, the output control unit 14 uses the external device such as a display, a buzzer, or a signal power not shown herein and notifies the operator that the power of the manipulator 31 cannot be turned on because the voltage of the battery 21 falls within the specific range. At this time, the output control unit 14 may also notify the management server in addition to or other than notifying the operator.

In S17, upon receipt of the notification of the output control unit 14, the operator may replace the battery 21 of the mobile manipulator 1 with a charged battery 21. In the case where the operator replaces the battery 21 with a charged battery 21, the controller 10 processes S12 again, measures the voltage of the battery 21, and starts the manipulator 31 through the work processes of S13 to S14.

Modified Examples

The starting timing of the manipulator 31 is not limited to the time when the mobile manipulator 1 is started. During a period in which the manipulator 31 is not used, the mobile manipulator 1 may turn off the power of the manipulator 31 and travel. At the timing of using the manipulator 31, the mobile manipulator 1 may perform the steps after S12 to start the manipulator 31.

Although an example in which the battery 21 supplies power to the traveling device 23 and the manipulator 31 is described, the invention is not limited thereto. The mobile robot 2 may also include a battery different from the battery 21 in order to supply power to the traveling device 23 and the controller 10. The battery 21 may also be additionally installed to the mobile robot 2 in accordance with the electric load mounted in the mobile robot 2.

The mobile robot 2 may also include, in addition to the controller 10, a controller controlling the operation of the traveling device 23 or the operation of the manipulator 31.

(Operation Example in the Case of Charging/Discharging the Battery 21)

Figure 3:
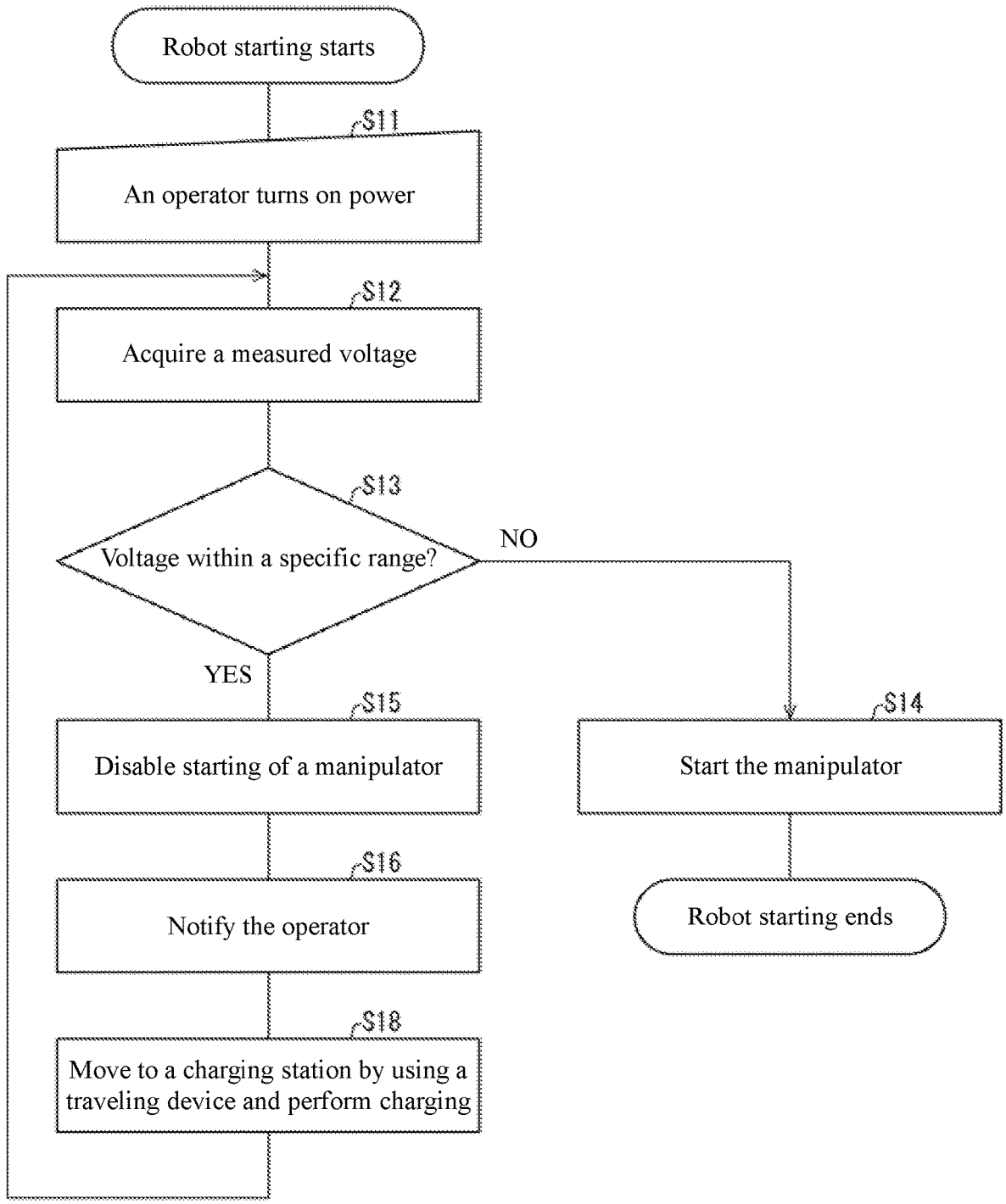
FIG. 3 is a flowchart illustrating a process of the mobile manipulator in a case of charging/discharging the battery when the voltage of the battery falls within a specific range according to an embodiment.

FIG. 3 is a flowchart illustrating a process of the mobile manipulator 1 in the case of charging/discharging the battery 21 when the voltage of the battery 21 falls within the specific range.

In FIG. 3, S17 in FIG. 2 is replaced by S18. In S18, the mobile manipulator 1 moves to a charging station not shown herein by using the traveling device 23. In the case where a lower voltage range in the voltage range in which the electric load is operable is the specific range, the charging station charges the battery 21. Comparatively, in the case where a higher voltage range in the voltage range in which the electric load is operable is the specific range, the charging station discharges the battery 21. That is, the charging station charges/discharges the battery 21 so that the voltage of the battery 21 falls out of the specific range. In addition, in the case where the mobile manipulator 1 has moved to the charging station, without further movement, the charging/discharging station performs charging/discharging so that the voltage of the battery 21 falls out of the specific range.

In particular, in the case where the specific range is a high voltage range, with replacement with the charged battery 21, the output of the battery 21 naturally becomes a high voltage. As a result, the manipulator 31 cannot be started. Therefore, if the battery 21 is discharged to a suitable voltage by using the charging/discharging station, the manipulator 31 can be started.

4. Functions and Effects

At the time of the starting of the manipulator 31, by using the condition determination unit 12, whether the output current of the battery 21 including the inrush current of the manipulator 31 can be determined in accordance with whether the voltage of the battery 21 falls within the specific range. In the case where the output current of the battery 21 including the inrush current is greater than the rated current, the manipulator 31 cannot be normally started, and the battery 21 may be damaged. Alternatively, it is possible that, due to the operation of a protection circuit of the battery 21, the battery 21 stops outputting, and the traveling device 23, etc., does not operate. Therefore, in the case where the inrush current is greater than the rated current, it is an effective solution that the mobile robot 2 disables the power-on of the manipulator 31.

In addition, even in the situation in which the voltage of the battery 21 falls within the specific range and the power-on of the manipulator 31 is disabled, the starting control unit 13 can turn on the power of the traveling device 23 and allow the mobile manipulator 1 to travel. Therefore, by using the traveling device 23, the mobile manipulator 1 can move to the charging/discharging station and charge/discharge the voltage of the battery 21 to a voltage not falling within the specific range.

Moreover, the output control unit 14 can notify the operator or the management server that the voltage of the battery 21 falls within the specific range and the power-on of the manipulator 31 is disabled. Therefore, the operator or the management server can replace the battery 21 of the mobile manipulator 1 with a charged battery 21 or move the mobile manipulator 1 to the charging station by using the traveling device 23 to be charged or discharged.

In addition, the input unit 15 can receive an external input, and arbitrarily set the specific range. Therefore, even if the configuration of the mobile manipulator 1 is changed, the battery 21 can be prevented from being damaged by changing the setting of the specific range. The user can mount any electric load to the mobile robot and set the specific range in accordance with the electric load.

Embodiment 2

Another embodiment of the invention will be described in the following. For the convenience of description, components having the same functions as components having been described in the above embodiment are labeled with the same reference symbols and the descriptions thereof will not be repeated.

Figure 4:
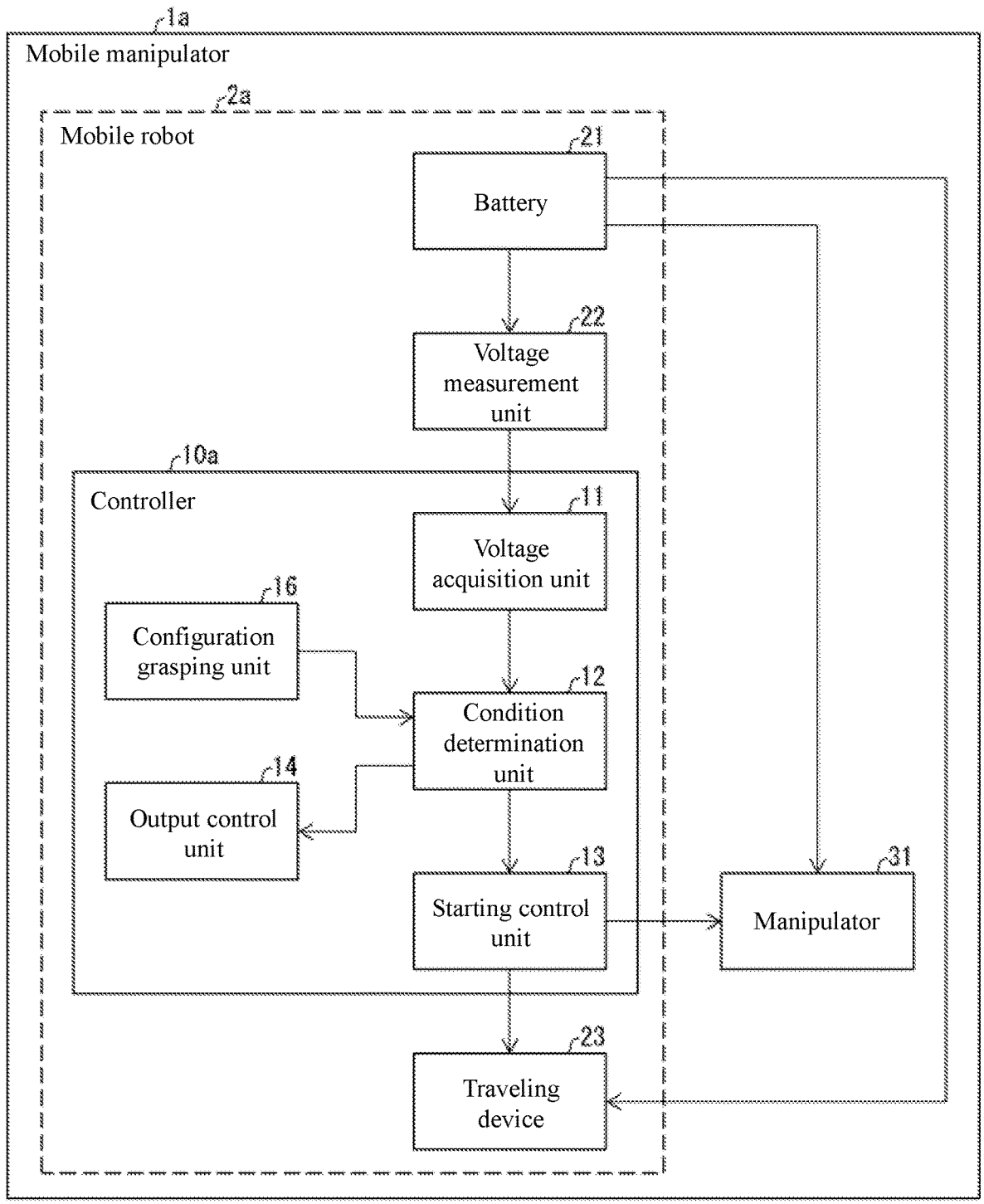
FIG. 4 is a diagram illustrating a configuration of main components of a mobile manipulator according to an embodiment.

FIG. 4 is a block diagram illustrating main components of a mobile manipulator 1a. The mobile manipulator 1a is different from the mobile manipulator 1, and includes a mobile robot 2a and the manipulator 31. The mobile robot 2a is different from the mobile robot 2, and includes a controller 10a in place of the controller 10. The controller 10a is different from the controller 10, and includes a configuration grasping unit 16 in place of the input unit 15.

The configuration grasping unit 16 grasps a system configuration from a changed part of the operation program in a state in which the configuration of the mobile manipulator 1a is changed and the operation program is changed. For example, the configuration grasping unit 16 specifies the electric load mounted to the mobile robot 2 from the operation program. The values of the inrush currents at respective voltages corresponding multiple electric loads may be recorded in advance in the configuration grasping unit 16. By measuring the inrush currents at the respective voltages with respect to the electric loads in advance, the user can record the values of the inrush currents in the configuration grasping unit 16 in advance. In addition, the current values when multiple other apparatuses (the controller 10, the traveling device 23, various sensors, and display apparatuses, etc.) that may be included in the mobile robot 2 are operating (or in a steady state) may also be recorded in the configuration grasping unit 16. Alternatively, multiple specific ranges respectively suitable for multiple electric loads may also be recorded in the configuration grasping unit 16 in advance. From such information, the configuration grasping unit 16 specifies the specific range of the voltage of the battery 21 so that the sum of the currents when other apparatuses included in the mobile robot 2 are operating and the inrush current of the electric load does not exceed the rated current of the battery 21. The configuration grasping unit 16 sets the specified new specific range in the condition determination unit 12. Accordingly, the configuration grasping unit 16 can grasp a change or addition of other apparatuses included in the mobile robot 2 (change of system configuration), and set the specific range suitable for the changed system configuration.

The configuration grasping unit 16 is not limited to grasping the system configuration based on a change of the operation program, but may also communicate with a configuration apparatus, an IO-Link (registered trademark), etc., and detect a system change. The configuration grasping unit 16 can obtain information such as the model of the configuration apparatus or the consumed power from the configuration apparatus itself. The configuration grasping unit 16 may change the specific range.

Therefore, the configuration grasping unit 16 can detect a change of the system configuration and grasp the system configuration without a setting input of the operator, thereby changing the specific range. As a result, the condition determination unit 12 can perform determination in the new specific range in the new system configuration and prevent the battery 21 from being damaged.

Embodiment 3

Figure 5:
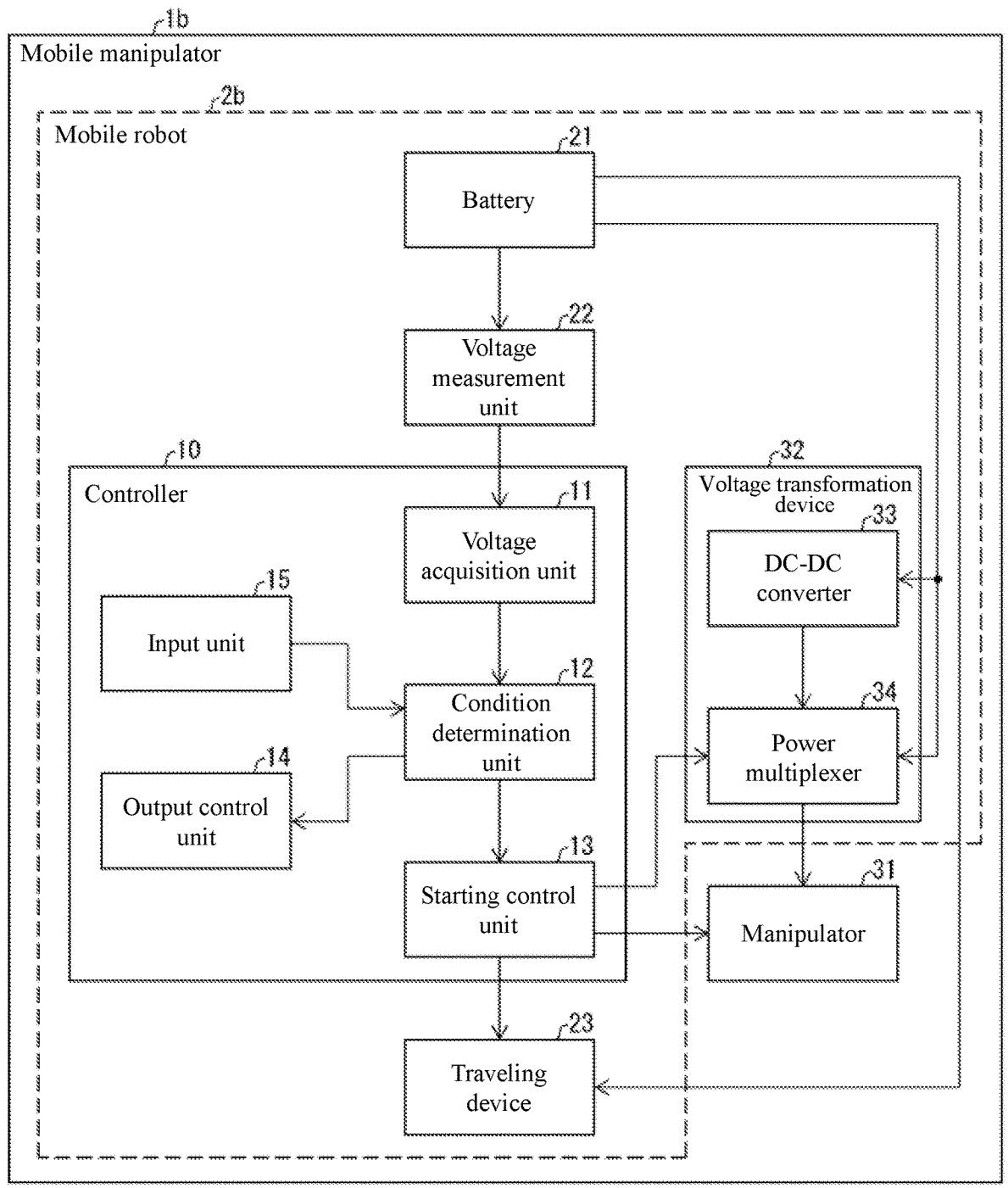
FIG. 5 is a diagram illustrating a configuration of main components of a mobile manipulator according to an embodiment.

FIG. 5 is a block diagram illustrating main components of a mobile manipulator 1b. The mobile manipulator 1b is different from the mobile manipulator 1, and includes a mobile robot 2b and the manipulator 31. The mobile robot 2b is different from the mobile robot 2, and further includes a voltage transformation device 32.

The voltage transformation device 32, for example, includes a DC-DC converter 33 and a power multiplexer 34. The power multiplexer 34 is a device that switches a power system by using an electromagnetic contact, a relay, or a semiconductor circuit. The voltage of the battery 21 is input to the DC-DC converter 33 and the power multiplexer 34 of the voltage transformation device 32. The output voltage of the DC-DC converter 33 is input to the power multiplexer 34. The output voltage of the power multiplexer 34 is supplied to the manipulator 31. The power multiplexer 34 follows the command of the starting control unit 13 to switch which input is to be output to the manipulator 31.

The voltage transformation device 32 is an apparatus that steps up or down the voltage input from the battery 21, and supplies power to the manipulator 31. In the case where the specific range is set to a low voltage, the voltage transformation device 32 steps up the voltage, and in the case where the specific range is set to a high voltage, the voltage transformation device 32 steps down the voltage, and transforms the voltage input to the manipulator 31 to a voltage outside the specific range. The voltage transformation ratio of the DC-DC converter 33 may be set in advance.

Figure 6:
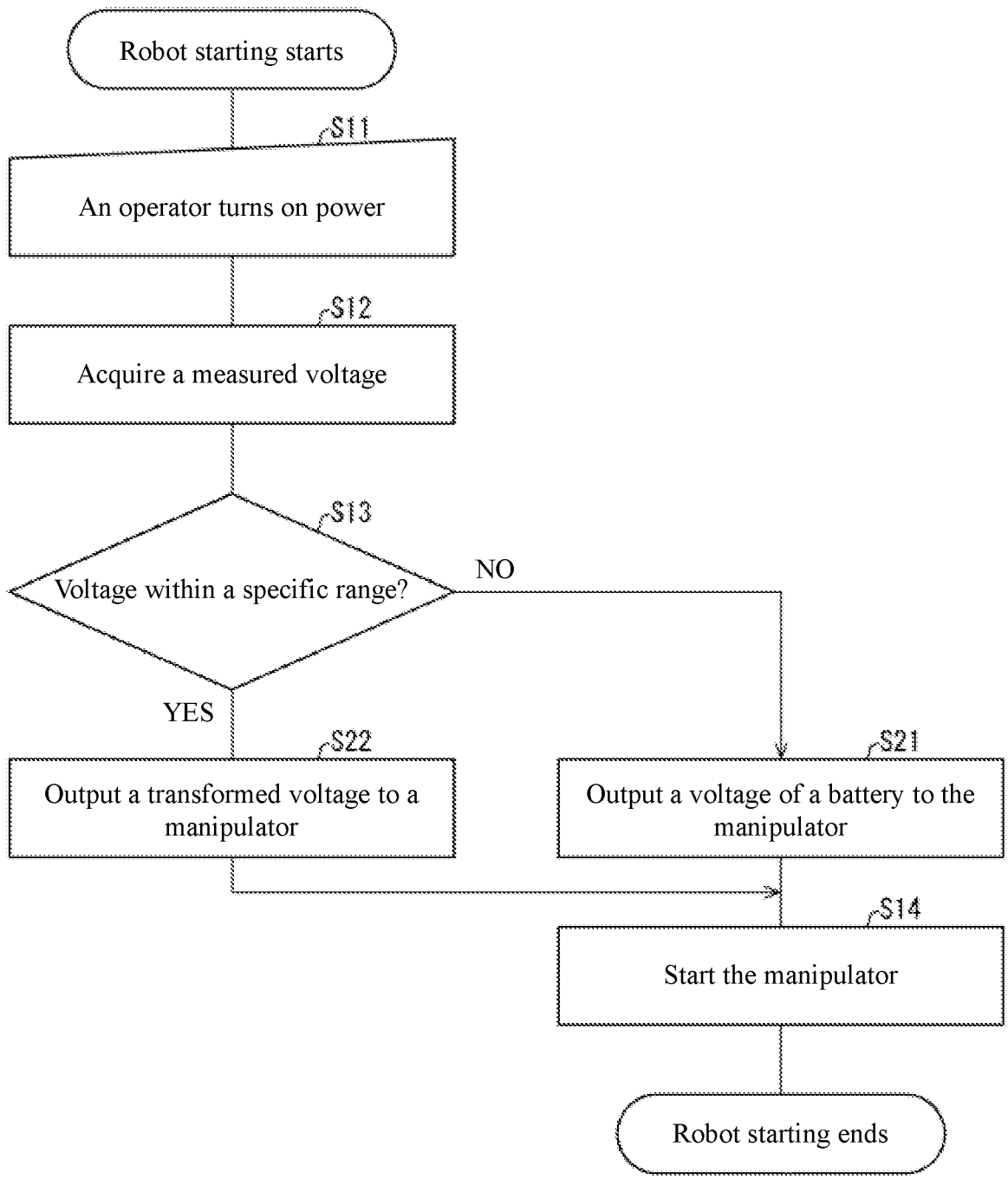
FIG. 6 is a flowchart illustrating a process of a mobile manipulator according to an embodiment.

FIG. 6 is a flowchart illustrating a process of the mobile manipulator 1b. S1 to S13 are the same as the flowchart shown in FIG. 2.

In the case where the voltage of the battery 21 is determined as outside the specific range (NO in S13), the starting control unit 13 instructs the power multiplexer 34 to output the voltage of the battery 21 to the manipulator 31 (S21). Together with this, the starting control unit 13 starts the manipulator 31 (S14).

In the case where the voltage of the battery 21 is determined as falling within the specific range (YES in S13), the starting control unit 13 instructs the power multiplexer 34 to output the voltage obtained by transforming the voltage of the battery 21 by using the DC-DC converter 33 to the manipulator 31 (S22). Together with this, the starting control unit 13 starts the manipulator 31.

Even in the case where the voltage input to the voltage transformation device 32, that is, the voltage of the battery 21, falls within the specific range, the voltage output by the transformation device 32, that is, the voltage input by the manipulator 31, is transformed into a voltage not falling within the specific range by the voltage transformation device 32. Therefore, the manipulator 31 can always be started.

[Implementation Example by Software]

The control block of the mobile manipulator 1 and the mobile manipulator 1a (in particular, the voltage acquisition unit 11, the condition determination unit 12, the starting control unit 13, the output control unit 14, the input unit 15, and the configuration grasping unit 16) may be realized by logic circuits (hardware) formed by integrated circuits (IC chips), and may also be realized by software.

In the latter case, the mobile manipulator 1 and the mobile manipulator 1a include a computer that executes commands of a program as software that realizes the respective functions. The computer, for example, includes one or more processors, and includes a computer readable recording medium storing the program. In addition, in the computer, the processor reads the program from the recording medium and executes the program, thereby achieving the objective of the invention. As the processor, for example, a central processing unit (CPU) can be used. As the recording medium, a "non-transitory tangible medium", such as a tape, a disc, a card, a semiconductor memory, a programmable logic circuit, etc., can be used, in addition to a read-only memory (ROM), etc. In addition, a random access memory (RAM), etc., for expanding the program may also be provided. Moreover, the program may also be supplied to the computer via any transmission medium (communication network, broadcast waves, etc.) able to transmit the program. According to an aspect of the invention, the program may be embodied in the form of data signals embedded in carrier waves and embodied through electronic transmission.

[Appendix]

In order to solve the above issue, a mobile robot according to an aspect of the invention is a mobile robot capable of mounting an electric load. The mobile robot includes: a voltage acquisition unit, acquiring a voltage of a battery supplying power to the electric load; a condition determination unit, determining whether the voltage falls within a specific range; and a starting control unit, in a case where the condition determination unit determines that the voltage falls within the specific range, (i) disabling starting of the electric load, or (ii) supplying the voltage of the battery that has been transformed to the electric load to start the electric load. The specific range is a portion of a voltage range in which the electric load is operable.

According to the configuration, at the time of starting the electric load, the battery can be prevented from being damaged by the inrush current of the electric load.

It may also be that, in the case where the condition determination unit determines that the voltage falls within the specific range, the starting control unit disables the starting of the electric load.

It may also be that the mobile robot further includes a traveling device supplied with power from the battery to allow the mobile robot to travel, and the starting control unit allows starting of the traveling device regardless of a determination result of the condition determination unit.

According to the configuration, even if the starting of the electric load is disabled, the traveling device can be operated. Therefore, the mobile robot can still be moved by the traveling device, and by charging or discharging the battery, the starting condition of the electric load can be adjusted.

The mobile robot may further include an output control unit performing notification in the case where the condition determination unit determines that the voltage falls within the specific range.

According to the configuration, in the situation in which the starting of the electric load is disabled, the operator can be notified, and the replacement or charging/discharging of the battery can be urged, so that the electric load can be started.

The mobile robot may further include an input unit receiving an input for changing the specific range.

The mobile robot may further include a configuration grasping unit grasping a system configuration of the mobile robot. In a case where a change of the system configuration is detected, the configuration grasping unit may change the specific range to be suitable for the system configuration.

According to the configuration, the specific range can be changed.

The mobile robot may include a voltage transformation device transforming the voltage from the battery to fall out of the specific range and outputting the voltage. In a case where the voltage falls within the specific range, the starting control unit may supply the voltage that has been transformed by the voltage transformation device to the electric load to start the electric load.

According to the configuration, even if the voltage of the battery falls within the specific range, it is possible that the voltage input to the electric load falls out of the specific range. Therefore, the starting condition of the electric load can be adjusted regardless of the voltage of the battery.

A mobile robot according to an aspect of the invention includes a manipulator as the electric load.

A method for controlling a mobile robot according to an aspect of the invention includes: a voltage acquisition step of acquiring a voltage of a battery supplying power to an electric load mounted in the mobile robot; a condition determination step of determining whether the voltage falls within a specific range; and a starting control step of, in a case where the voltage is determined as falling within the specific range in the condition determination step, (i) disabling starting of the electric load, or (ii) supplying the voltage of the battery that has been transformed to the electric load to start the electric load. The specific range is a portion of a voltage range in which the electric load is operable.

The mobile robot according to various aspects of the invention may be realized by using a computer. In such case, a control program of the mobile robot realizing the mobile robot by operating a computer as the respective units (software components) provided in the mobile robot by using the computer and a computer readable recording medium recording the control program also fall within the scope of the invention.

[Additional Note]

The invention is not limited to the embodiments, and various modifications are possible within the scope indicated in the claims. Embodiments obtained by appropriately combining technical means disclosed in different embodiments also fall within in the technical scope of the invention.

What is claimed is:

1. A mobile robot, capable of mounting an electric load and comprising:
    a voltage acquisition unit, acquiring a voltage of a battery supplying power to the electric load;
    a condition determination unit, determining whether the voltage falls within a specific range;
    a starting control unit, in a case where the condition determination unit determines that the voltage falls within the specific range, (i) disabling starting of the electric load, or (ii) supplying the voltage of the battery that has been transformed to the electric load to start the electric load; and
    a configuration grasping unit, grasping a system configuration of the mobile robot,
    wherein the specific range is a portion of a voltage range in which the electric load is operable,
    wherein in a case where a change of the system configuration is detected, the configuration grasping unit changes the specific range to be suitable for the system configuration.

2. The mobile robot as claimed in claim 1, wherein in the case where the condition determination unit determines that the voltage falls within the specific range, the starting control unit disables the starting of the electric load.

3. The mobile robot as claimed in claim 2, further comprising a traveling device, supplied with power from the battery to allow the mobile robot to travel,
    wherein the starting control unit allows starting of the traveling device regardless of a determination result of the condition determination unit.

4. The mobile robot as claimed in claim 2, further comprising an output control unit, performing notification in the case where the condition determination unit determines that the voltage falls within the specific range.

5. The mobile robot as claimed in claim 1, further comprising an input unit receiving an input for changing the specific range.

6. The mobile robot as claimed in claim 1, comprising a voltage transformation device transforming the voltage from the battery to fall out of the specific range and outputting the voltage,
    wherein in a case where the voltage falls within the specific range, the starting control unit supplies the voltage that has been transformed by the voltage transformation device to the electric load to start the electric load.

7. A mobile manipulator, comprising the mobile robot as claimed in claim 1,
    wherein the mobile manipulator comprises a manipulator as the electric load.

8. A non-transitory computer readable medium, storing a control program of a mobile robot, configured to cause a computer to function as the mobile robot as claimed in claim 1, wherein the control program of the mobile robot is configured to cause the computer to function as the voltage acquisition unit, the condition determination unit, and the starting control unit.

9. A method for controlling a mobile robot, the method comprising:
    a voltage acquisition step of acquiring a voltage of a battery supplying power to an electric load mounted in the mobile robot;
    a condition determination step of determining whether the voltage falls within a specific range;
    a starting control step of, in a case where the voltage is determined as falling within the specific range in the condition determination step, (i) disabling starting of the electric load, or (ii) supplying the voltage of the battery that has been transformed to the electric load to start the electric load; and
    a configuration grasping step of grasping a system configuration of the mobile robot, and changing the specific range to be suitable for the system configuration in a case where a change of the system configuration is detected,
wherein the specific range is a portion of a voltage range in which the electric load is operable.

* * * * *